US008722188B2

(12) United States Patent
Fuss et al.

(10) Patent No.: US 8,722,188 B2

(45) Date of Patent: May 13, 2014

(54) CERAMIC PARTICLE COMPRISING AN ALUMINA CRYSTALLINE PHASE

(75) Inventors: Tihana Fuss, Derry, NH (US); Laurie San-Miguel, Cavaillon (FR); Kevin R. Dickson, Hudson, OH (US); Walter T. Stephens, Cleveland, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 12/650,955

(22) Filed: Dec. 31, 2009

(65) Prior Publication Data

US 2010/0167056 A1 Jul. 1, 2010

Related U.S. Application Data

(60) Provisional application No. 61/141,890, filed on Dec. 31, 2008.

(51) Int. Cl.

| | |
|---|---|
| ***C03C 10/06*** | (2006.01) |
| ***C03C 3/04*** | (2006.01) |
| ***C03C 3/076*** | (2006.01) |
| ***C03C 3/083*** | (2006.01) |
| ***C04B 35/10*** | (2006.01) |
| ***C04B 35/14*** | (2006.01) |

(52) U.S. Cl.

USPC ................. 428/402; 501/10; 501/39; 501/53; 501/68; 501/73; 501/80; 501/85; 501/153; 501/154

(58) Field of Classification Search

USPC ............. 501/39, 53, 68, 73, 80, 85, 153, 154, 501/10; 428/402

See application file for complete search history.

(56) References Cited

U.S. PATENT DOCUMENTS

| | | | | |
|---|---|---|---|---|
| 3,935,017 | A * | 1/1976 | Gardner | 501/153 |
| 4,268,311 | A * | 5/1981 | VerDow | 501/141 |
| 4,343,723 | A * | 8/1982 | Rogers et al. | 502/68 |
| 4,666,867 | A * | 5/1987 | Beall et al. | 501/5 |
| H0000282 | H * | 6/1987 | Edwards et al. | 423/709 |
| 4,680,230 | A * | 7/1987 | Gibb et al. | 428/403 |
| 4,717,695 | A * | 1/1988 | Oda | 501/143 |
| 4,944,905 | A * | 7/1990 | Gibb et al. | 264/660 |
| 5,418,195 | A * | 5/1995 | Kostuch et al. | 501/80 |
| 5,516,348 | A * | 5/1996 | Conwell et al. | 51/309 |
| 5,611,829 | A * | 3/1997 | Monroe et al. | 51/309 |
| 5,981,415 | A * | 11/1999 | Waku et al. | 501/80 |
| 7,175,786 | B2 * | 2/2007 | Celikkaya et al. | 264/5 |
| 7,615,172 | B2 * | 11/2009 | Palamara et al. | 264/131 |
| 7,713,918 | B2 * | 5/2010 | Stephenson et al. | 507/269 |
| 2004/0148966 | A1 * | 8/2004 | Celikkaya et al. | 65/17.4 |
| 2006/0219600 | A1 * | 10/2006 | Palamara et al. | 209/3 |
| 2007/0281850 | A1 * | 12/2007 | Beall | 501/9 |
| 2014/0011658 | A1 * | 1/2014 | Fuss et al. | 501/2 |

* cited by examiner

*Primary Examiner* — Hoa (Holly) Le

(74) *Attorney, Agent, or Firm* — Stewart A. Fraser

(57) ABSTRACT

Disclosed is a process for producing ceramic particles, such as proppants, that have at least 10 percent total porosity. The process includes forming a particle precursor that includes 5 percent to 30 percent of a first ceramic material and at least 40 percent of a second ceramic material. The sintering temperature of the first ceramic material may be lower than the sintering temperature of a second ceramic material. Heating the precursor to a maximum temperature above the sintering temperature of the first material and below the sintering temperature of the second material. Also disclosed is a ceramic article that has a particular combination of chemistry and alumina crystalline phase.

15 Claims, 2 Drawing Sheets

CERAMIC PARTICLE COMPRISING AN ALUMINA CRYSTALLINE PHASE

CROSS-REFERENCE TO RELATED APPLICATION

This application claims the benefit of U.S. Provisional Application No. 61/141,890 filed Dec. 31, 2008.

BACKGROUND OF THE INVENTION

Ceramic particles are produced for use in a wide variety of industrial applications. Some of these applications include using a plurality of ceramic particles: as a proppant to facilitate the removal of liquids and/or gases from wells that have been drilled into geological formations; as a media for scouring, grinding or polishing; as a bed support media in a chemical reactor; as a heat transfer media; as a filtration media; and as roofing granules when applied to asphalt shingles.

Examples of patents that disclose ceramic particles and methods of manufacturing the same include U.S. Pat. Nos. 4,632,876, 7,036,591 and CA 1,217,319.

SUMMARY

Embodiments of the present invention provide methods of producing ceramic particles that establish and maintain porosity throughout the particle manufacturing process. The process of these embodiments provides an alternative to processes that use significant quantities of pore forming materials which must be removed from the particle during the manufacturing process. Other embodiments of the present invention provide ceramic articles with a particular chemistry and crystalline phase.

In one embodiment, this invention is a process for producing ceramic particles which may include the following steps. Forming a particle precursor comprising more than 5 weight percent but less than 30 weight percent of a first ceramic material and at least 40 weight percent of a second ceramic material. The ceramic materials are substantially uniformly distributed within the precursor. Heating the precursor to a maximum temperature above the sintering temperature of the first ceramic material and below the sintering temperature of the second ceramic material. The ceramic particle has at least 10 percent total porosity.

In another embodiment, this invention is a ceramic article comprising a chemical composition comprising $Al_2O_3$ and $SiO_2$ wherein the ratio of the weight percent of $Al_2O_3$ to $Al_2O_3$ and $SiO_2$, as determined by XRF analysis, is less than to 0.72; and at least 5 weight percent of the article is an alumina crystalline phase, as determined by XRD analysis using an internal standard.

DETAILED DESCRIPTION

Figure 1:
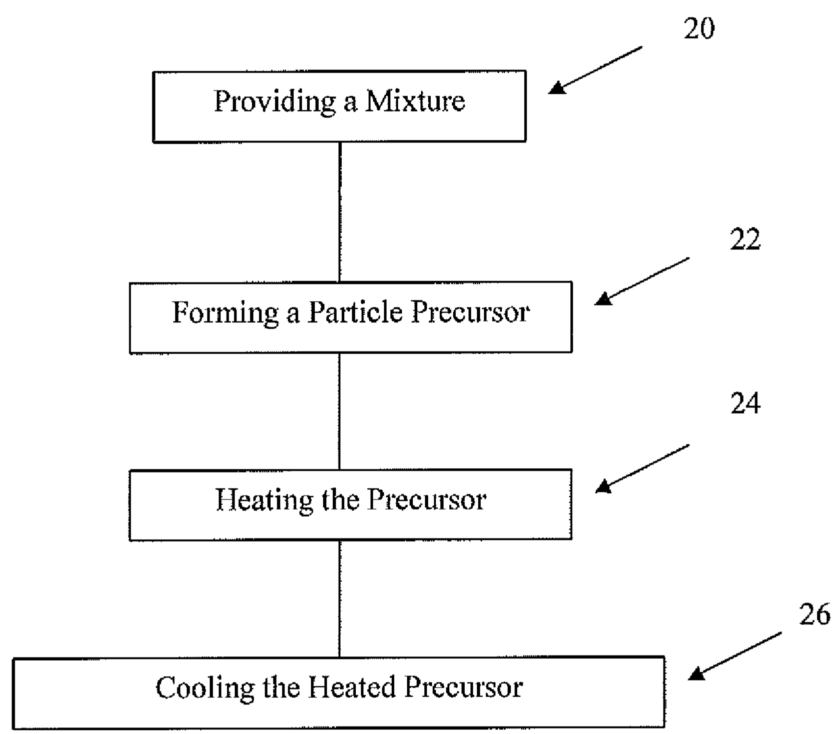
FIG. 1 is a process flow chart according to one embodiment.

As used herein, the phrase "crush resistance" refers to the particle's ability to withstand crushing. Crush resistance is commonly used to denote the strength of a proppant and may be determined using ISO 13503-2:2006(E). A strong proppant generates a lower weight percent crush resistance than a weak proppant at the same closure stress. For example, a proppant that has a 2 weight percent crush resistance is considered to be a strong proppant and is preferred to a weak proppant that has a 10 weight percent crush resistance.

As used herein, the phrase "ceramic particle's total porosity" refers to the sum of the particle's open porosity and closed porosity. The ceramic particle's total porosity, closed porosity and open porosity may be determined as will be described below.

As used herein, the phrase "alumina crystalline phase" includes any crystalline phase that contains an ordered array of aluminum and oxygen atoms and specifically includes crystalline phases commonly identified, for example, as alpha-alumina, theta-alumina, delta-alumina, gamma-alumina, chi-alumina and kappa-alumina. Common names for some of the alumina crystalline phases may also be used herein. For example, alpha alumina may also be identified herein as corundum.

As used herein references to chemical content of a ceramic article refer to the weight percent component of the measured chemical.

Processes for manufacturing ceramic particles have been devised and used for many years to manufacture large quantities of ceramic particles such as proppants. Because proppants are used in a wide variety of geological formations, at different depths and exposed to extremes in temperature and pressure, the physical characteristics of the proppants may need to be customized in order to optimize the performance of the proppant in a particular environment. Some of the properties which may impact the performance of the proppant include: specific gravity, porosity, crush strength and conductivity. Changing one physical property may inherently change one of more of the other properties in an undesirable manner. Consequently, significant effort has been made to develop processes that alter the properties that are important in one application while simultaneously minimizing undesirable changes to the particle's other properties. Furthermore, proppant manufacturers have tried to reduce the cost of manufacturing proppants by eliminating materials and/or process steps without compromising the performance of the proppant.

With regard to producing a proppant having a desired specific gravity, some processes have relied upon the use of pore forming materials to create porosity within the proppant. Two common classes of pore formers are known as either transient or in-situ. Transient pore formers may be removed from the proppant by a thermal or chemical process which results in the creation of a pore or pores approximately equal in volume to the material that was removed. Examples of transient pore formers include nut shells, synthetic organic material, sawdust, and cereal waste. In contrast, "in-situ" pore formers typically expand upon heating and create a pore that is significantly larger than the volume occupied by the pore former prior to heating. An example of an in-situ pore former is silicon carbide. The pores created by the pore formers may be open pores and/or closed pores.

One problem with using pore formers is that they add to the cost of production because the pore former must be purchased, mixed with the other ingredients used to make the proppant and then energy and/or materials must be used to remove the pore former. In some processes, the removal of pore forming materials results in the generation of solid or gaseous by-products which may cause environmental problems that must be addressed and increases the cost of the manufacturing process. Furthermore, the use of pore formers may create variability within the proppant manufacturing process because the steps used to incorporate and remove the pore forming material may include slight differences in mixing procedures, heating temperatures, etc. While a change in the temperature at which the proppant is heated may appear to be relatively small, the change in temperature may cause a significant change in the volume of gas generated by an in-situ pore former which would result in a larger pore than would be created at a slightly lower temperature.

Embodiments of the present invention address some of the problems described above by selecting materials and processing steps that enable the proppant manufacturer to produce a particle precursor that has approximately the desired porosity incorporated into the particle precursor and this porosity is retained in the proppant. Pore formers are not required to generate porosity.

Shown in FIG. 1 is a process flow chart of an embodiment that includes the following steps. Step 20 includes providing a mixture that includes a first ceramic material and a second ceramic material wherein the sintering temperature of the first ceramic material is less than the sintering temperature of the second ceramic material. Optionally, the mixture may include other materials such as binders and solvents. Suitable solvents include water and some alcohols. A binder may be one or more materials selected from organic starches, such as drilling starch, as well as gums or resins that are sold commercially for such purposes. A binder may also be an inorganic material such as clay or an acid. Binders are usually added in an amount less than 10 weight percent of the mixture and may be added dry or as a solution. While a binder may be responsible for some level of porosity in a ceramic particle, binders are not considered pore formers herein. The composition of the mixture may be limited to less than 0.1 weight percent of one or more pore formers selected from the list consisting of a transient pore former, to an in-situ pore former, and combinations thereof. Transient pore formers may be limited to less than 0.05 weight percent of the mixture. In-situ pore formers may be limited to less than 0.01 weight percent of the mixture. In one embodiment, the mixture will not include any pore formers.

Step 22 includes forming a particle precursor which is defined herein as a particle wherein the first and second ceramic materials are substantially uniformly distributed therethrough and solvents, such as water, have been removed so that the precursor's loss on drying (LOD) after heating to between 110° C. and 130° C. for two hours is less than one percent of the precursor's starting weight. The precursor may or may not contain optional ingredients such as a binder. The precursor may include 5 weight percent to 30 weight percent of the first ceramic material and at least 40 weight percent of the second ceramic material. In some embodiments, the precursor may include between 10 weight percent and 20 weight percent of the first ceramic material.

In step 24, the precursor is heated to a maximum temperature which is above the sintering temperature of the first ceramic material and below the sintering temperature of the second ceramic material. In some embodiments, the precursor may be heated to a maximum temperature which is above the melting temperature of the first ceramic material which is higher than the sintering temperature of the first ceramic material. During the heating step, if the temperature exceeds the melting temperature of the first ceramic material, the first ceramic material may convert from a solid material to a flowable material and may flow over the second ceramic material. In step 26, the particle precursor is cooled to ambient temperature thereby forming a ceramic particle.

With regard to step 20, both the first and second ceramic materials may be provided as powders which include a plurality of granules. In particular embodiments, granules may range from 1 to 10 microns, more specifically from 6 to 8 microns. The first and second ceramic materials may be selected so that the sintering temperature of the first ceramic material is lower than the melting temperature of the first ceramic material and both are lower than the sintering to temperature of the second ceramic material. While the exact difference between the melting temperature of the first ceramic material and the sintering temperature of the second ceramic material may not be critical, a difference of 50° C. may be workable in particular embodiments.

For example, a suitable first ceramic material may be selected from the group consisting of feldspar and nepheline syenite, which has a melting temperature of approximately 1100° C., and combinations thereof. A suitable second ceramic material may be selected from the group consisting of clay, magnesia, alumina and bauxite, which has a sintering temperature of approximately 1450° C., and combinations thereof.

With regard to step 22, forming a particle precursor may be achieved by processing the mixture through a machine such as an Eirich RO2 mixer, which is available from American Process Systems, Eirich Machines Inc. of Gourney, Ill., USA, thereby forming at least a portion of the mixture into a large number of small granules which may be referred to as greenware. If the granules contain optional ingredients, such as solvents and binders, the optional ingredients may be removed by drying the granules in an oven to a sufficiently high temperature, such as 200° C. or higher, to drive the optional ingredients from the granules. If desired, the particle precursors may be processed through a screening apparatus that includes a No. 8 ASTM sieve designation, which has 2.36 mm apertures, and a No. 70 ASTM sieve designation, which has 212 μm sieve apertures. The precursors selected for heating in step 24 may flow through the No. 8 sieve and not flow through the No. 70 sieve.

In step 24, the precursor is heated to a maximum temperature which is above the sintering temperature, and perhaps above the melting temperature, of the first ceramic material and below the sintering temperature of the second ceramic material. Consequently, the maximum temperature of the heating step is less than the sintering temperature of the second ceramic material. In particular embodiments, the maximum temperature of the heating step is at least 25° C. less than the sintering temperature of the second ceramic material. As used herein, a to ceramic material's melting temperature is the temperature at which the ceramic material begins to soften and become flowable. Flowability of the first ceramic material at a temperature that is lower than the sintering temperature of the second ceramic material may allow the first ceramic material to at least partially flow onto the second ceramic material. Contact between the first and second ceramic materials during the heating step may allow the creation of bonds between the granules of the first and second ceramic.

Figure 2:
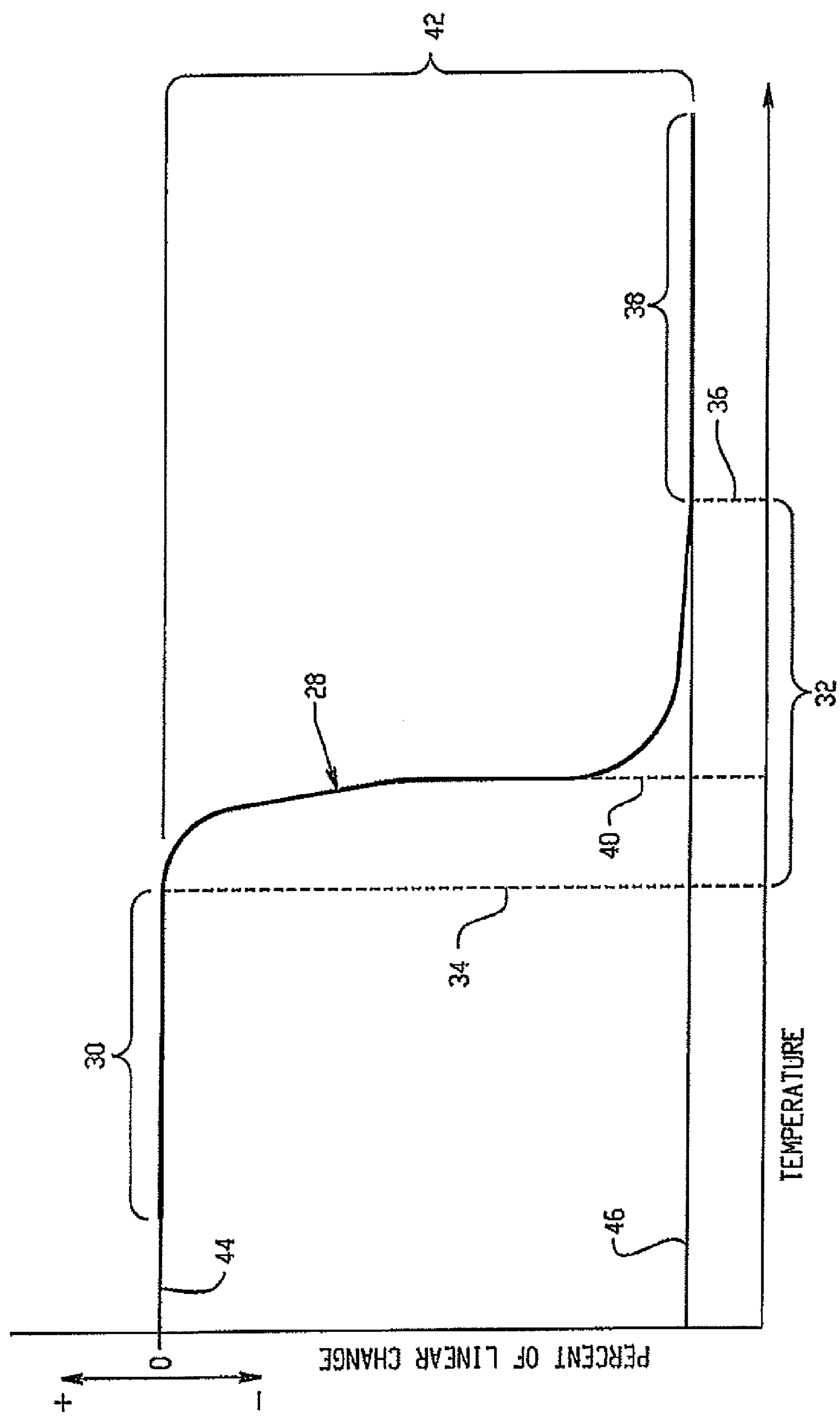
FIG. 2 is a dilatometry curve.

A ceramic material's sintering temperature may be determined by creating a plot of dilatometry data and identifying the temperature which corresponds to the midpoint of the curve. For example, shown in FIG. 2 is an exemplary graph of a dilatometry curve where the percent of linear change (PLC) is plotted versus temperature for a hypothetical ceramic material that could be used to form a proppant. The percent of linear change may be determined using dilatometry. A commercially available dilatometer is an Anter model 1161. Sintering profile 28 includes a first region 30 where the length of the material remains essentially unchanged as the temperature of the material is increased. The second region 32 of the sintering profile is defined by a first temperature 34 at which the material starts to shrink and a second temperature 36 at which the shrinkage terminates. The third region 38 of the sintering profile begins at temperature 36 and represents the region where material no longer shrinks despite further increases in the material's temperature. Temperature 34 indicates the start of shrinkage and temperature 36 indicates the termination of shrinkage. Temperature 40 represents the material's nominal sintering temperature which may be determined by identifying the point on the curve where the material has achieved 50% of the amount of shrinkage disclosed by the curve and then determining the temperature at which the 50% shrinkage was achieved. The total amount of shrinkage 42 is represented by the difference between the value of the starting linear dimension 44 and the value of the final linear dimension 46.

In step 26, the particles of the first ceramic material and the second ceramic material are cooled to ambient temperature, which is defined herein as to any temperature between 20° C. and 30° C., thereby forming a bonded, ceramic particle. The total weight of the first and second ceramic materials may represent at least 85 weight percent, more preferably 90 weight percent, of the ceramic particle. During the heating step, the first ceramic material may form a glass phase. The materials and processing conditions are selected so that the ceramic particle's weight may be within eight percent of the precursor's weight. In some embodiments, the ceramic particle's weight may be within four weight percent, or even within two weight percent, of the precursor's weight. If desired, the ceramic particles may be processed through a screening apparatus that includes a first screen, which eliminates particles having a diameter larger than the first screen's opening, and a second screen, which eliminates particles having a diameter smaller than the second screen's opening. A suitable first screen is a No. 8 ASTM sieve, which has 2.36 mm openings, and a suitable second screen is a No. 70 ASTM sieve, which has 212 μm openings. The ceramic particles selected for use as a proppant may flow through the No. 8 sieve and not flow through the No. 70 sieve.

Ceramic articles, such as proppants, made by a process according to embodiments of this invention experience very little densification during the heating and bonding steps because there are no or very little pore formers incorporated into the precursor and the maximum heating temperature does not exceed the sintering temperature of the second ceramic material. Due to the lack of densification, the amount of porosity that is inherently incorporated in the precursor during the forming step may remain substantially the same as the amount of porosity in the ceramic particle after the formation of the ceramic particle. The ceramic particle's total porosity may be at least 2 percent, 5 percent, 10 percent or even 15 percent of the ceramic particle's total volume. The particle's closed porosity may represent more than 70 percent, 75 percent or 80 percent of the total porosity. The particle's open porosity may represent less than 20 percent, 15 percent or even 10 percent of the total porosity. Intermediate values such as: 82 percent closed porosity and 18 percent open porosity; or 88 percent closed porosity and 12 percent open porosity are also feasible.

A particle's total porosity, open porosity and closed porosity may be determined as follows. Begin by using a GEO pycnometer, which uses a fine powder to measure the particle's apparent specific gravity ($\rho_{GEO}$). The fine powder effectively encapsulates the particle and does not penetrate the particle's open or closed pores. Next, measure the particle's apparent specific gravity ($\rho_{Heparticle}$) using a helium pycnometer wherein the helium penetrates the particle's open pores. Next, determine the true density ($\rho_{Hepowder}$) of the ceramic particle by grinding the particle such that the ground particles flow through a 60 mesh screen and then use helium pycnometry to determine the volume of the ground particles. The total porosity ($P_{total}$), closed porosity ($P_{closed}$), and open porosity ($P_{opened}$) may then be calculated using the following formulas:

$$\text{Total porosity (opened + closed)} = P_{total} = 1 - \frac{\rho_{GEO}}{\rho_{Hepowder}}$$

$$\text{Closed porosity} = P_{closed} = \rho_{GEO}\left(\frac{1}{\rho_{Heparticle}} - \frac{1}{\rho_{Hepowder}}\right)$$

$$\text{Opened porosity} = P_{opened} = P_{total} - P_{closed}$$

EXAMPLES

Three lots of proppants, designated herein as Lot A, Lot B and Lot C, were made as follows. Lot A represents ceramic particles made by a conventional process and sintered at 1250° C. Lot B represents ceramic particles made by the same conventional process as Lot A but sintered at 1450° C. Lot C represents ceramic particles made by an embodiment of a process of this invention. Shown in Table 1 are the lots' raw materials, sintering temperatures, crush data and porosity data.

TABLE 1

| | Lot A (comparison) | Lot B (comparison) | Lot C (invention) |
|---|---|---|---|
| Main Charge | | | |
| Alpha Alumina | 5455 g | 5455 g | — |
| 80:20 weight percent mixture of alpha alumina and nepheline syenite | — | | 5455 g |
| Drilling starch | 108.9 g | 108.9 g | 108.9 g |
| water | 1145.6 g | 1145.6 g | 1145.6 g |
| Dust In | | | |
| Alpha Alumina | 1364 g | 1364 g | — |
| 80:20 weight percent mixture of alpha alumina and nepheline syenite | — | | 1364 g |
| Sintering Temperature | 1250° C. | 1450° C. | 1250° C. |
| Average crush at 51.7 MPa (7,500 psi) | 14.4% | 2.2% | 8.1% |
| Total Porosity | 17.8% | 1.0% | 12.4% |
| Closed Porosity (% of total porosity) | 1.3% (8.5) | 1.0% (100) | 10.6% (87) |

Lot A was manufactured by combining 5,455 grams of alpha alumina with 108.9 g of drilling starch. The dry ingredients were disposed into an Eirich RO2 mixer with both the pan and rotor rotating. The rotor speed was set at 80 percent of maximum speed. After 30 seconds, the water was poured into the mixer directly onto the rotating dry ingredients. Approximately 30 seconds was used to distribute the water thereby producing a moistened mixture. The moistened mixture, which may be referred to herein as the "main charge", was allowed to rotate for three minutes during which time a plurality of spheres were formed. The rotor speed was then reduced to minimum speed as the pan continued to rotate. Next, the 1,364 g of alpha alumina, which may be described as the "dust in" charge, was then added slowly to the rotating spheres. The slow addition of the dust in charge took approximately three minutes and may be described herein as "dusting in" the alpha alumina. After completing the dusting in of the alpha alumina, the pan continued to rotate for approximately 20 seconds. The formed spheres of alpha alumina, binder and water, were removed from the mixer, dried overnight and sintered in a rotating kiln at 1250° C. for two hours.

The ceramic particles in Lot B were manufactured exactly the same as the particles in Lot A except that the particle precursors were sintered at 1450° C.

The ceramic particles in Lot C were manufactured using an 80:20 weight ratio of alpha alumina and nepheline syenite, respectively, as both the main charge and the dust in charge. All other ingredients and processing conditions were the same as used to make the precursors in Lots A and B. The particle precursors in Lot C were sintered at 1250° C. which is above the melting point of the nepheline syenite and below the sintering temperature of the alpha alumina.

After sintering, all lots were screened to a common particle size distribution. Crush resistance, total porosity and closed porosity were determined as described above. The data shows that the ceramic particles of Lot A had adequate total porosity (17.8%) but the crush resistance at 51.7 MPa was 14.4% which may be undesirable for use in commercial operations. Lot B had very good crush resistance (2.2%) but the total porosity (1%) was well below the desired 10% total porosity. In contrast, Lot C, which represents ceramic particles made by an embodiment of a process of this invention, had acceptable crush resistance (8.1%) and acceptable total porosity (12.4%). Furthermore, only Lot C had total porosity and closed porosity both greater than 10%. Embodiments of this invention may have crush resistance less than 15% at 51.7 MPa (7,500 psi) and total porosity greater than 10%.

An embodiment of a process of this invention may be used to generate ceramic articles, including proppant particles, which have a particular combination of chemistry and alumina crystalline phase. According to the phase diagram for an $Al_2O_3$ and $SiO_2$ binary system, if the weight ratio of $Al_2O_3$ to the total of $Al_2O_3$ and $SiO_2$ is greater than 0.72, the article should exhibit an alumina crystalline structure. Conversely, if the ratio of $Al_2O_3$ to the total of $Al_2O_3$ and $SiO_2$ is less than 0.72, the article should not exhibit an alumina crystalline structure. Contrary to this teaching, ceramic articles of this invention may have a ratio of $Al_2O_3$ to the total of $Al_2O_3$ and $SiO_2$ less than 0.72 and at the same time, at least a portion of the article has an alumina crystalline phase structure. In some embodiments, the alumina crystalline phase may be greater than 5 percent, 10 percent, or even 20 percent by weight as determined by XRF analysis and the ratio of $Al_2O_3$ to the total of $Al_2O_3$ and $SiO_2$ may be less than 0.65, 0.55 or even 0.45. With particular reference to proppants, an alumina crystalline phase structure is desirable because the alumina crystalline phase improves the proppant's crush strength. This particular combination of chemistry and phase may be produced using an embodiment of a process of this invention. Furthermore, as will be illustrated and described below, calcining the second ceramic material prior to forming the mixture used to make the article can also be used in combination with the previously described process to produce a ceramic article having the particular relationship between chemistry and alumina crystalline phase.

To illustrate the impact that adding the first ceramic material to the second ceramic material has on the ratio of the weight percent of $Al_2O_3$ to $Al_2O_3$ and $SiO_2$, two lots, designated herein as Lot D and Lot E, were prepared and manufactured into disc shaped articles. Lot D was manufactured using a bauxite ore that had been milled to attain a $d_{50}$ particle size of approximately 8 μm. A known quantity of the milled bauxite ore was mixed with a solvent, 10 weight percent water, and a binder, 1 weight percent of a polyvinyl alcohol (PVA) solution (20% concentration). A 6.5 g quantity of the mixture was disposed into a circular die cavity that measured approximately 32 mm in diameter. A circular plate secured to a press was then used to compress the mixture in the cavity to approximately 34.5 MPa (5000 psi) thereby generating a disc that measured approximately 32 mm in diameter. Lot E was manufactured using an 80:20 mixture of bauxite ore and nepheline syenite. Prior to mixing with the 10 weight percent water and 1 weight percent PVA, both the ore and nepheline syenite were separately milled to attain a $d_{50}$ particle size of approximately 8 μm. A disc was formed of the mixture in lot E using the same process used to make the disc in lot D. All of the discs were then heated to 1250° C. for two hours. An x-ray fluorescent (XRF) analytical apparatus was then used to determine the ratio of the weight percent of $Al_2O_3$ to $Al_2O_3$ and $SiO_2$. An x-ray diffraction (XRD) analytical apparatus using Si powder as an internal standard was used to determine the phases of each disc. Shown below in Table 2 are the XRF and XRD analytical results for Lots D and E.

TABLE 2

| | Lot D | Lot E |
|---|---|---|
| XRF[1] | 0.771 | 0.658 |
| XRD | 24% corundum | 38% corundum |

[1]ratio of the weight percent of $Al_2O_3$ to the total of $Al_2O_3$ and $SiO_2$ The data supports the conclusion that Lot E, which included the addition of nepheline syenite relative to Lot D, had a 0.658 ratio of the weight percent of $Al_2O_3$ to $Al_2O_3$ and $SiO_2$ which was lower than 0.771 ratio of the weight percent of $Al_2O_3$ to $Al_2O_3$ and $SiO_2$ found in Lot D. At the same time, Lot E had 38 percent corundum which was higher than the 24 percent corundum in Lot D.

To demonstrate the impact of calcining the second ceramic material in this embodiment on the (1) article's ratio of the weight percent of $Al_2O_3$ to $Al_2O_3$ and $SiO_2$ and (2) the alumina crystalline phase, two lots, designated herein as Lot F and Lot G, were prepared and manufactured into disc shaped components. Lot F was manufactured using bauxite ore that had been calcined between 800° C. and at least 900° C. in an industrial calciner prior to milling the ore to a particle size having a $d_{50}$ of approximately 8 μm. The milled, calcined ore was then mixed with 10 weight percent water and 1 weight percent PVA. Discs of the mixture from lot F were manufactured using the same process as described above with reference to lots D and E. The discs from lots D and E were then heated to 1250° C. for two hours.

Calcining the ore to a temperature greater than 800° C., which may be referred to herein as over-calcining, was intended to increase the ore's alumina crystalline content and also remove organic compounds as indicated by a reduction in the ore's Loss on Ignition (LOI). In some embodiments, the alumina crystalline content of the over calcined ore may be at least 5 weight percent, 10 weight percent or even 20 weight percent. The ore's LOI may be less than 3 weight percent, 2 weight percent or even 1 weight percent. Ore with a lower LOI is less reactive than ore with a higher LOI. The over calcined ore's alumina crystalline content and LOI may be controlled by controlling the time and temperature of the over calcination process.

Lot G was manufactured using an 80:20 mixture of bauxite ore and nepheline syenite. Prior to mixing with the nepheline syenite, the bauxite ore used in lot G had been calcined between 800° C. and at least 900° C. in an industrial calciner.

Both the over calcined ore and nepheline syenite were separately milled to attain a $d_{50}$ particle size of approximately 8 μm before the ore and nepheline syenite were mixed with the 10 weight percent water and 1 weight percent PVA. Using the compaction process described above, 6.5 g quantities of the mixture from lot G were made into discs.

The discs from lots F and G were heated to 1250° C. for two hours. The XRD and XRF analytical techniques used to characterize Lots D and E were used to characterize Lots F and G. The results are shown in Table 3.

TABLE 3

| | Lot F | Lot G |
|---|---|---|
| XRF[1] | 0.824 | 0.717 |
| XRD | 44% corundum | 49% corundum |

[1]ratio of the weight percent of $Al_2O_3$ to the total of $Al_2O_3$ and $SiO_2$ The data supports the conclusion that Lot G, which included the addition of nepheline syenite relative to Lot F, had a 0.717 ratio of the weight percent of $Al_2O_3$ to $Al_2O_3$ and $SiO_2$ which was lower than 0.824 ratio of the weight percent of $Al_2O_3$ to $Al_2O_3$ and $SiO_2$ found in Lot F. At the same time, Lot G had 49 percent corundum which was higher than the 44 percent corundum in Lot F.

For convenience, the data from Tables 2 and 3 has been assembled below in Table 4.

TABLE 4

| | Lot D | Lot E | Lot F | Lot G |
|---|---|---|---|---|
| XRF[1] | 0.771 | 0.658 | 0.824 | 0.717 |
| XRD (% corundum) | 24 | 38 | 44 | 49 |

[1]ratio of the weight percent of $Al_2O_3$ to $Al_2O_3$ and $SiO_2$

Lots D and F represent ceramic articles wherein the ratio of the weight percent of $Al_2O_3$ to $Al_2O_3$ and $SiO_2$ exceeds 0.72 and according to the $Al_2O_3$ and $SiO_2$ phase diagram, the presence of alumina in crystalline phases (i.e. corundum) would be expected. In contrast, lots E and G represent ceramic articles wherein the ratio of the weight percent of $Al_2O_3$ to $Al_2O_3$ and $SiO_2$ was less than 0.72 and the presence of alumina in crystalline phases would not be expected. Surprisingly, ceramic articles of embodiments of this invention include both a chemical composition wherein the ratio of the weight percent of $Al_2O_3$ to $Al_2O_3$ and $SiO_2$ is less than 0.72 and an alumina crystalline phase is present. Without wishing to be bound by a particular theory, it is believed that embodiments of the present invention allow relatively strong ceramic precursors to be created without reaching an equilibrium state where alpha alumina content might be compromised. The combined impact of using nepheline syenite and overcalcined ore is evident in the data for lot G which, according to XRD data, had an alumina crystalline phase content (i.e. 49%) that was twice the amount of alumina crystalline phase found in Lot D (i.e 24%) which did not incorporate either nepheline syenite or over calcined ore.

The above description is considered that of particular embodiments only. Modifications of the invention will occur to those skilled in the art and to those to who make or use the invention. Therefore, it is understood that the embodiments shown in the drawings and described above are merely for illustrative purposes and are not intended to limit the scope of the invention, which is defined by the following claims as interpreted according to the principles of patent law.

What is claimed is:

1. A bonded ceramic particle comprising: a first ceramic material and a second ceramic material, wherein said ceramic materials are uniformly distributed through said particle; a chemical composition comprising $Al_2O_3$ and $SiO_2$ wherein the ratio of the weight percent of $Al_2O_3$ to $Al_2O_3$ and $SiO_2$, as determined by XRF analysis, is less than 0.72; and at least 5 weight percent of the particle is an alumina crystalline phase, as determined by XRD analysis using an internal standard.

2. The ceramic particle of claim 1 further comprising a total porosity that exceeds at least 2 percent.

3. The ceramic particle of claim 1 further comprising a total porosity that exceeds at least 5 percent.

4. The ceramic particle of claim 1 further comprising a total porosity that exceeds at least 10 percent.

5. The ceramic particle of claim 1 wherein the ratio of the weight percent of $Al_2O_3$ to $Al_2O_3$ and $SiO_2$ is less than 0.65.

6. The ceramic particle of claim 1 wherein the ratio of the weight percent of $Al_2O_3$ to $Al_2O_3$ and $SiO_2$ is less than 0.55.

7. The ceramic particle of claim 1 wherein the ratio of the weight percent of $Al_2O_3$ to $Al_2O_3$ and $SiO_2$ is less than 0.45.

8. The ceramic particle of claim 1 wherein at least 10 weight percent of the particle is an alumina crystalline phase.

9. The ceramic particle of claim 1 wherein at least 20 weight percent of the particle is an alumina crystalline phase.

10. The ceramic particle of claim 1 wherein at least 30 weight percent of the particle is an alumina crystalline phase.

11. The ceramic particle of claim 1 wherein the first and second ceramic materials represent at least 85 weight percent of the ceramic particle.

12. The ceramic particle of claim 11, wherein the first and second ceramic materia represent at least 90 weight percent of the ceramic particle.

13. The ceramic particle of claim 1 wherein said particle has a diameter between 212 μm and 2.36 mm.

14. The ceramic particle of claim 13, wherein said particle has a crush resistance less than 15% at 51.7 MPa (7,500 psi).

15. The ceramic particle of claim 14 further comprising a total porosity that exceeds at least 10 percent.

* * * * *